G. Westinghouse,

Horse Power,

No. 317, Reissued July 10, 1855.

AM. PHOTO-LITHO. CO. N.Y. (OSBORNE'S PROCESS)

UNITED STATES PATENT OFFICE.

GEORGE WESTINGHOUSE, OF CENTRAL BRIDGE, NEW YORK.

ENDLESS-CHAIN HORSE-POWER.

Specification forming part of Letters Patent No. 11,104, dated June 13, 1854; Reissue No. 317, dated July 10, 1855.

*To all whom it may concern:*

Be it known that I, G. WESTINGHOUSE, of Central Bridge, in the county of Schoharie and State of New York, have invented certain new and useful Improvements in Endless-Chain Horse-Powers; and I do hereby declare that the following is a full, clear, and exact description of the principle or character which distinguishes them from all other things before known, and of the usual manner of making, modifying, and using the same.

My improvement consists in the mode of construction, attachment, and application of the gearing and chain, by which I secure a durable, efficient, and cheap structure, and equalizes the tension of the endless chain, so that it at all times shall be equally tight, or nearly so.

The construction is as follows: A is the frame, of common construction, and of the dimensions of the most approved endless-chain horse-powers. At either end of the frame are shafts *a* bearing upon them the carrying-reels *b*. These reels are of minimum size, and are in circumference five links of the chain, which reduces them to the minimum size, while, together with a peculiarity in the chain about to be named, I secure at all times an equal tension upon the chain, such as has never before been effected, and reduce the reels *b* to a size far below any ever before used practically, although I believe a reduction has been before attempted. The value of this reduction is well known to the practical operator, reducing considerably the height of the machine. These reels *b* have an odd number of projections to receive the rods of the chain, namely, five. The chain is made with links *c*, rods or axles *d*, upon the ends of which are pulleys *e*, all of ordinary construction, and traversing a rail on either side of the frame above, at *f*, Fig. 2, and below at *h*, in the usual manner.

Figure 1:
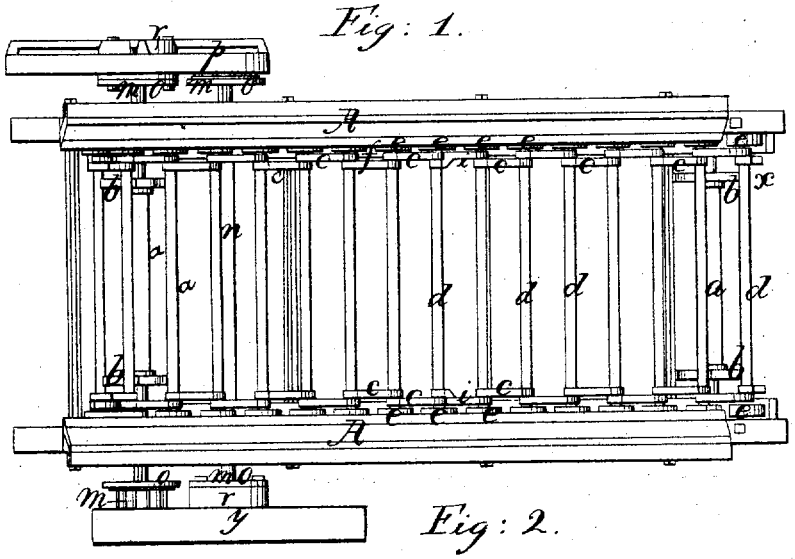
Figure 2:
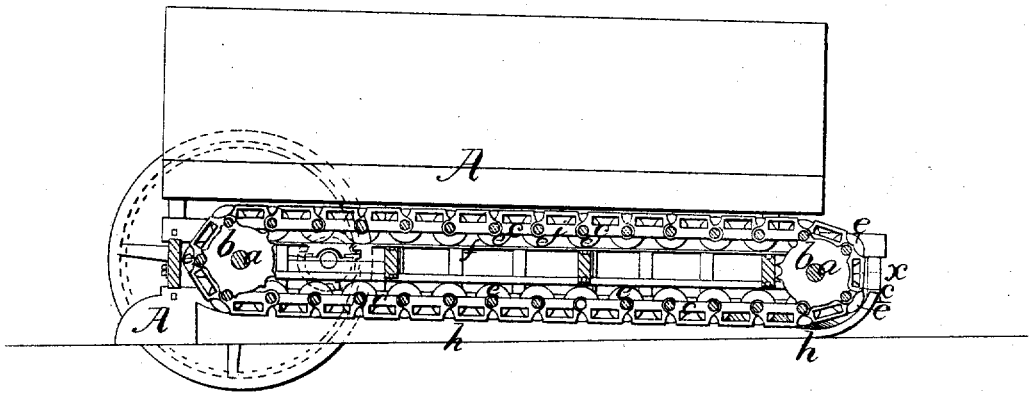

The peculiarity of my chain, differing from all others, is the introduction of an odd link, as shown at *i*. The ordinary links, *c*, are placed alternately out and in, as shown in the plan, Fig. 1; but the link *i* has one end on the outside of the adjoining link on that end, and on the inside of the other adjoining link at the other end, as is clearly shown in the plan, the link itself being bent inward with a jog at that point—in other words, being cast of a different pattern from the others horizontally, while it maintains its general configuration vertically, as shown in Fig. 2. By means of this odd link *i*, I am enabled to place my reels *b*, as shown in Fig. 2, so that while the reels on one shaft are in the position shown at *x* there are parts of two links occupying a relative position on the reels on the other shafts as clearly represented in the drawing, by means of which arrangement the tension of the chain is kept up more equally, and it is prevented from sagging and striking upon the lower rail, *h*, as in other horse-powers where this device does not exist.

The gearing is as follows: On the shaft *a*, at the front end of the machine, there is a hub or pinion, *m*, affixed at each end outside of the frame. Behind this shaft, and parallel with it, there is a counter shaft, *n*, of the same length, and also bearing upon its two ends a similar hub or pinion, *m'*. These four hubs or pinions are of the same pattern or size on their periphery, and have a flange, *o*, on the inner faces projecting beyond their cogs. One of these pinions only is shown in the plan, Fig. 1. The wheel that gears into a pinion on either one of these shafts is lettered *p*. It has an internal gear or cogs on the inside of the rim, pitched so as to gear into the pinion on one shaft when the wheel is affixed to the outer shafts. The arms of this wheel are joined to the outside of the rim, as is usual, with internal-gear wheels, and are connected with a hub which is hollow, and form a cap, which fits over the hub or pinion, which is securely keyed to the shaft, and up against the flange *o* above named, as clearly shown at *r* in the plan, where a similar device is used to attach the band-wheel *q*. Two bolts pass through the flange and face of the cap through the hub, or between the cogs of the pinion, to unite the cap thereto. This will generally be found sufficient, but more may be used or other devices for fastening may be employed. By this construction it will be seen that the driving-wheel *p* can be shifted to either end of either shaft in an expeditious and permanent manner without the labor or difficulty of keying on or off. The four pinions are necessary to last as long as one driving-wheel. They are therefore required to wear out the one driving-wheel, and can be changed for that purpose when worn out, thus making the power more valuable.

I wish it understood that the mode of gearing by internal gear and pinion I have adopted is old and has long been in use, but the peculiar construction of the parts of it is my invention; therefore

What I claim therein as new, and desire to secure by Letters Patent, is—

The construction and attachment of the gearing, substantially as herein set forth, having a hub or pinion permanently affixed on the ends of each shaft, to either of which the center caps or hubs of either the driving or band wheels fit and are fastened.

GEORGE WESTINGHOUSE.

Witnesses:
JOHN WELCH,
ERASTES ROOT.